(12) United States Patent
Eenhoorn

(10) Patent No.: US 6,499,796 B1
(45) Date of Patent: Dec. 31, 2002

(54) ARRANGEMENT FOR A VEHICLE OR PART OF A VEHICLE

(76) Inventor: Erik Jeroen Eenhoorn, Paaul Pellastraat 52, NL-7558 HG Hengelo (NL)

( * ) Notice: Subject to any disclaimer, the term of this patent is extended or adjusted under 35 U.S.C. 154(b) by 0 days.

(21) Appl. No.: 09/868,475

(22) PCT Filed: Dec. 14, 1999

(86) PCT No.: PCT/NL99/00772

§ 371 (c)(1),
(2), (4) Date: Feb. 5, 2002

(87) PCT Pub. No.: WO00/35718

PCT Pub. Date: Jun. 22, 2000

(30) Foreign Application Priority Data

Dec. 16, 1998 (NL) ............................................ 1010821

(51) Int. Cl.⁷ .................................................. B60J 7/00
(52) U.S. Cl. ....................... 296/189; 296/181; 296/183; 293/107
(58) Field of Search ........................... 296/189, 203.03; 293/107; 180/282; 280/43.23, 755, 767, 837, 838; 701/36, 38

(56) References Cited

U.S. PATENT DOCUMENTS

| | | | | |
|---|---|---|---|---|
| 1,773,327 A | * | 8/1930 | Thwaits ....................... | 280/838 |
| 3,603,633 A | * | 9/1971 | Eshelman .................... | 293/107 |
| 3,656,790 A | * | 4/1972 | Truesdell .................... | 293/107 |
| 3,708,194 A | * | 1/1973 | Amit ........................... | 293/107 |
| 3,822,076 A | * | 7/1974 | Mercier et al. .............. | 293/107 |
| 3,880,438 A | * | 4/1975 | Klein .......................... | 296/183 |
| 4,313,566 A | * | 2/1982 | Klein .......................... | 137/255 |
| 4,386,674 A | * | 6/1983 | Sugata ........................ | 180/282 |
| 4,411,462 A | * | 10/1983 | Buehrig et al. ............. | 296/189 |
| 4,574,986 A | * | 3/1986 | Baris et al. ................. | 105/358 |
| 5,301,980 A | * | 4/1994 | Dingle ....................... | 296/181 |
| 5,658,011 A | * | 8/1997 | Byon ......................... | 180/274 |
| 5,725,265 A | * | 3/1998 | Baber ........................ | 293/107 |
| 6,169,946 B1 | * | 1/2001 | Griessbach ................. | 180/282 |
| 6,178,991 B1 | * | 1/2001 | Schiwek .................... | 137/351 |
| 6,270,130 B1 | * | 8/2001 | Kim ........................... | 293/107 |
| 6,304,805 B1 | * | 10/2001 | Onogi ........................ | 180/282 |
| 6,324,447 B1 | * | 11/2001 | Schramm et al. ............ | 701/38 |
| 6,349,247 B1 | * | 2/2002 | Schramm et al. ............ | 701/38 |
| 6,375,251 B1 | * | 4/2002 | Taghaddos .................. | 296/189 |
| 6,402,199 B1 | * | 6/2002 | Wojnowski ................. | 280/838 |
| 2001/0028173 A1 | * | 10/2001 | Demarquilly et al. ....... | 293/107 |

* cited by examiner

*Primary Examiner*—Kiran Patel
(74) *Attorney, Agent, or Firm*—Knobbe Martens Olson & Bear LLP

(57) ABSTRACT

A shock-absorbing safety apparatus for a vehicle, such as a truck or tanker. The apparatus includes inflatable containers attached to the exterior sides of the vehicle, a plurality of overturning sensors, a controller, and inflation sources corresponding to each inflatable container. The overturning sensors provide a signal indicating an incipient overturning condition to the controller which, upon determination that an overturn is incipient, induces the inflation sources to inflate at least those inflatable Containers disposed on the downward side of the vehicle. The overturning sensors can include pressure sensors detecting pressure between wheels of the vehicle and the road surface as well as tilt or angle sensors detecting the angular orientation of the vehicle with resect to the road. The inflation sources provide gas, which may be a fire-retardant gas. The containers preferably are made of a strong, abrasion resistant material and present a relatively high coefficient of friction.

25 Claims, 3 Drawing Sheets

ARRANGEMENT FOR A VEHICLE OR PART OF A VEHICLE

RELATED APPLICATIONS

This application claims the benefit of the Dutch Application 1010821 filed Dec. 16, 1998 in the Netherlands and is a National Phase Application in the United States of PCT/NL99/00772, filed Dec. 14, 1999.

BACKGROUND OF THE INVENTION

1. Field of the Invention

The invention relates to a safety arrangement for a vehicle or part of a vehicle, in particular, a motor vehicle such as a truck, tanker, tailer or bus.

2. Description of the Related Art

It is known that vehicles for various reasons, e.g. travelling at an excessive speed through turns, violent maneuvers to avoid collisions, or collisions with fixed structures or other vehicles, may be induced to overturn For many vehicles, the cargo or contents, such as in trucks and tankers, has a significant influence on the overturning tendency of the vehicle. For example, stored liquid can shift within a container upon sudden maneuvers of the tankers. This moving liquid can cause an impelling force contributing to overturning of the vehicle. In general, these so-called unpackaged tankers have a relatively higher chance of overturning than other vehicles.

Unpackaged tankers are often filled with chemical or petrochemical material. An undesirable result of the tanker overturning can be a crack or rupture in the tank leading to spillage of the material stored within. This has many undesirable effects including risk of fire, contamination of the environment with the contents of the tanker, and explosion.

It will be understood from the foregoing that there is a need for protecting motor vehicles, such as tankers, from damage in case of an overturning condition.

SUMMARY OF THE INVENTION

The above-mentioned needs are addressed by the invention which, in one aspect, is a shock absorbing apparatus which can be applied to an outside of a vehicle wherein the apparatus will expand or enlarge in volume upon initial overturning of the vehicle such that the apparatus deploys shock absorbing elements between the road and the overturning vehicle such that damage to the vehicle and/or the road is reduced The safety apparatus also reduces the risks of materials contained within the tanker from escaping the same. According to one aspect of the invention, the apparatus includes inflatable flexible containers applied to relevant sides of the vehicle and a control system which will measure and react to an overturning of the vehicle and activate an inflation system for inflating the containers.

In other aspects, the safety arrangement includes a control system provided with sensors which continuously indicate pressures upon the wheels of the vehicle and the position of the wheel shafts of the vehicle with respect to the road surface, In the event of a lack of a predefined wheel pressure with respect to the road caused by, e.g., loss of contact with one or more of the wheels with the road and or a detection of an excessive degree of vehicle tilt, the start of an overturn condition is registered by the system and inflation of the relevant containers is initiated on the overturning, downward side of the vehicle. Impact between the vehicle and the road is absorbed by the inflated containers so as to reduce damage to the vehicle, possibly other adjacent vehicles, and the road as well as protecting the surrounding environment from deleterious effects which could be caused by rupture of the tanker. In another aspect, the amount of wheel pressure and/or the relative position of the wheel shafts of the vehicle with respect to the road will determine activation of the inflation system for the relevant containers. This aspect of the invention inhibits unnecessary inflation of the relevant containers in the event of a short interruption of contact between one or more wheels and the road without other indication of an incipient overturn of the vehicle.

The inflatable containers can be filled with a gas which is normally maintained either as a solid or liquid or as a gas stored at high pressure which is released into the container to inflate the same. In certain aspects, the gas may be a fire inhibiting gas, such as a halogen gas, and/or a reactive material acting to reduce undesirable chemical effects of a spilled or leaked material within the vehicle.

Another aspect of the invention is that the safety apparatus is configured as substantially flat and elongate elements extending lengthwise along the sides of the vehicle, and, in certain aspects thereof, may substantially follow the contour of the vehicle such that the aerodynamic resistance of the vehicle provided with the safety apparatus is affected to a reduced extent However, as previously mentioned the safety apparatus includes inflatable containers which would extend outwards from the sides of the vehicle to provide protection in case of an overturn condition. An additional advantageous aspect of the invention is that placement of the safety apparatus along the sides of the vehicle provides an insulative layer to the vehicle which may include tanks.

Yet another aspect of the invention is that the inflatable containers may be made of a durable material, such as a synthetic material, provided with abrasion resistant ridge protrusions such that the material of the contains provides an increased coefficient of friction with the road. This aspect of the invention provides the advantage that an overturned vehicle in sliding motion with the road will benefit from the increased coefficient of friction of the inflatable containers and thus the sliding momentum of the vehicle will be arrested in a reduced distance thereby reducing opportunities for collisions with other vehicles or obstacles.

These and further objects and advantages of the invention will be explained in greater detail in the detailed description as follows with reference being made to the drawings.

DETAILED DESCRIPTION OF THE PREFERRED EMBODIMENT

Figure 1:
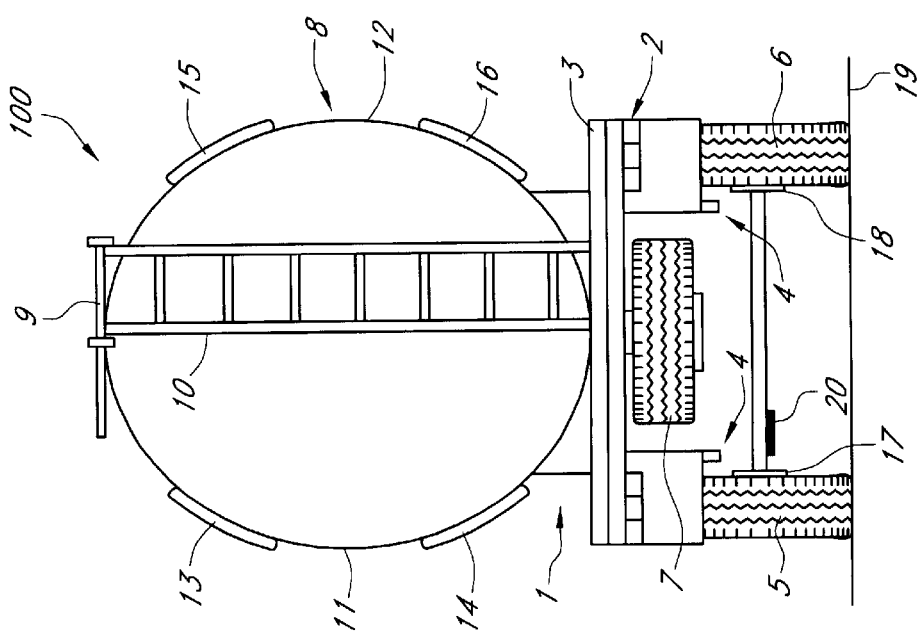
FIG. 1 is a rear view of a motor vehicle, in this embodiment comprising a tanker, provided with a shock absorbing apparatus for a vehicle in a ready state.

Reference will now be made to the figures wherein like reference numerals refer to like parts throughout. FIG. 1 is a rear view of a motor vehicle 1, in this embodiment illustrated as a tanker, comprising a chassis 2 with a load platform 3, a suspension 4, rear wheels 5 and 6, and a spare tire and wheel 7 of types well-known in the art and provided with a shock absorbing apparatus 100. On the load platform 3, a cylindrical tank 8 is mounted having an upper opening 9 which can be reached by a user via a ladder 10. The tank 8 is adapted to contain material that can be a health or fire risk if spilled. According to one embodiment the shock absorbing apparatus 100 comprises substantially flat inflatable containers 13, 14 and 15, 16 provided to sides 11 and 12 of the tank 8 respectively. The containers 13, 14 and 15, 16 are attached to the sides 11 and 12, respectively, of the tank 8 and substantially conform to the outer contour of the tank 8 so as to have a reduced effect on the wind resistance of the vehicle 1. The inflatable containers 13, 14, 15, 16 comprise a strong, abrasion resistant flexible material that is fire-resistant and has a relatively high coefficient of friction with respect to a road surface 19. In certain embodiments adapted for use with a standard size tank 8, the containers 13, 14, 15, 16 are approximately 2 m long and are approximately 30 cm in diameter when inflated and have a thickness of approximately 5–15 cm before inflation.

In this embodiment the sock absorbing apparatus 100 also comprises a plurality of pressure measuring sensors 17, 18 in communication with the suspension 4 so as to provide a signal indicative of the pressure between the wheels 5, 6 and the road surface 19. The pressure measuring sensors 17, 18 may comprise load cells in communication with the suspension 4 to establish a pressure or weight load between the wheels 5, 6 and the road surface 19. The shock absorbing apparatus 100 also comprises an angle sensor 20 arranged along a rear axle joining the wheels 5, 6. The angle sensor 20 provides a signal indicative of the angular orientation of the vehicle 1 with respect to the road surface 19 ($\beta$ in FIG. 2) to provide an indication of the degree of tilt of the vehicle 1. The sensors 17, 18, and 20 act as overturning sensors in a manner that will be described in greater detail below.

Figure 4:
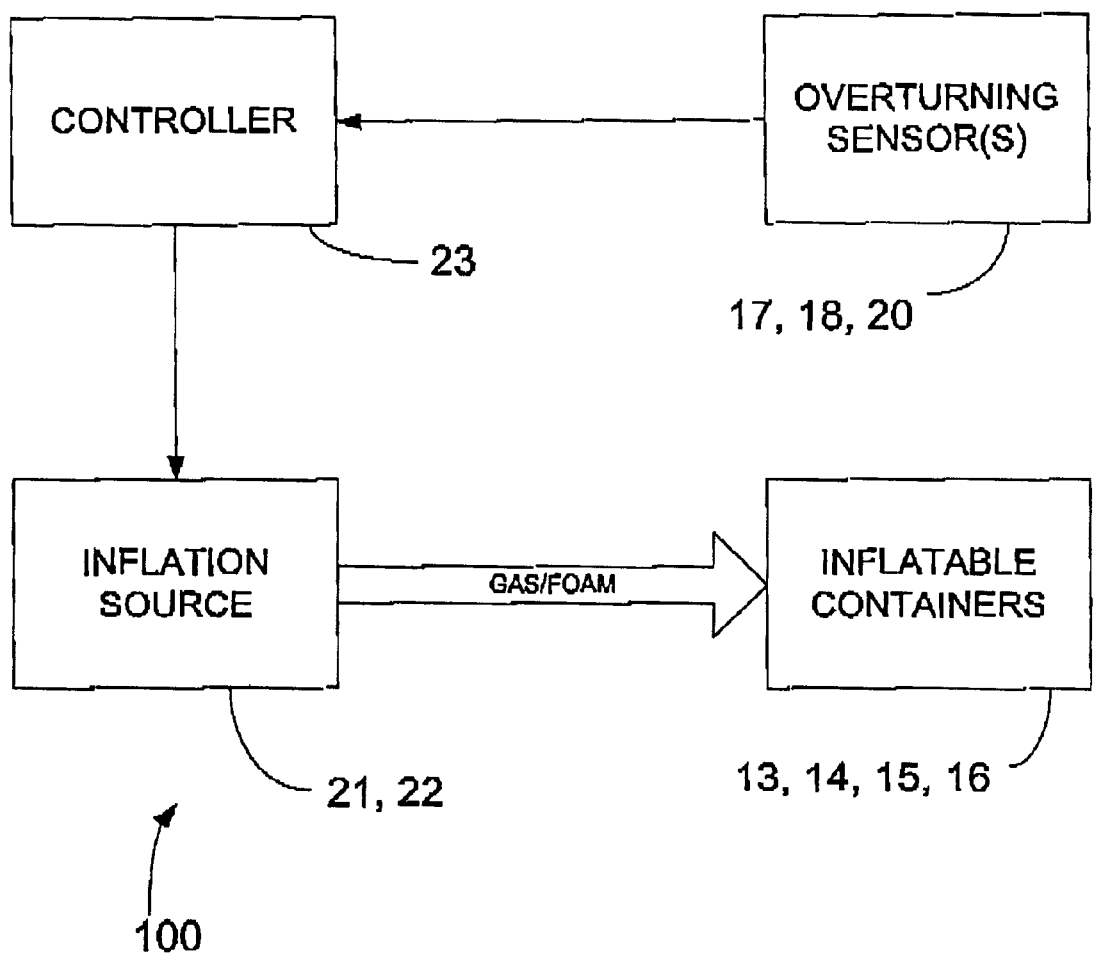
FIG. 4 is a functional block diagram of the shock absorbing apparatus of FIGS. 1, 2, and 3.

The shock absorbing apparatus 100 also comprises a controller 23 and inflation sources 21,22 as shown in FIG. 4. The controller 23 receives signals from the overturning sensors 17, 18, 20 and is also in communication with the inflation sources 21, 22 so as to act as a control system Upon determination, based on the signals from the overturning sensors 17, 18, 20 that an incipient over condition is present, the controller 23 can send a signal to the inflation sources 21, 22 inducing the inflation sources 21, 22 to inflate the inflatable containers 13, 14, In certain embodiments the overturning sensors 17, 18 and 19 provide an electrical signal to the controller 23 and, in these embodiments, the controller 23 comprises a microprocessor and appropriate control programs adapted to determine that the signals provided by the sensors 17, 18, 20 exceed a predetermined variation from normal indicating an incipient overturn of the vehicle 1.

In other embodiments, the overturning sensors 17, 18, 20 provide a direct physical signal, such as a hydraulic or pneumatic pressure, to the controller 23 and, in these embodiments, the controller 23 comprises a pressure sensor and valving that can pass a signal to the inflation sources 21, 22 upon determination that an incipient overturn condition of the vehicle 1 is present. It will be understood that the controller 23, embodied as an electronic processor and/or as hydraulic/pneumatic valving provides a safety against undesired inflation of the inflatable containers 13, 14, 15, 16.

In certain embodiments, the system 100 employs overturning sensors 17, 18 comprising pressure sensors. In other embodiments, the system 100 employs overturning sensor 20 comprising an angle sensor. In certain applications, it can be preferable to employ both overturning sensors 17, 18 comprising pressure sensors as well as overturning sensors 20 comprising angle sensors. The combination of these sensors 17, 18 and 20 provides the advantage that intermittent loss of contact between one or more of the wheels 5, 6 and the road surface 19 would generally provide an overturning indication, however, this intermittent signal could be due to travel of the vehicle 1 over a rough road surface, e.g., with potholes, ruts, etc. The additional Confirmatory signal from the overturning signal 20 can confirm that the vehicle 1 is, indeed, tipping and not solely experiencing intermittent loss of contact of one or more of the wheels 5, 6 with the road 19 because of the uneven nature thereof The inflation sources 21, 22 comprises a source of gas and/or foam that may be released in a rapid manner upon receipt of an initiating signal from the controller 23. In certain embodiments, the inflation sources 21, 22 may comprise a liquid or solid propellant that can undergo a chemical reaction to generate gas in a rapid manner, such as a combination of sodium azide ($NaN_3$) with potassium nitrate ($KNO_3$) which together product nitrogen gas ($N_2$). in other embodiments, the inflation sources 21, 22 can comprise a compressed gas container that can release gas previously stored at a relatively high pressure to a greater volume at reduced pressure at or above atmospheric. in certain applications, a fire risk might be present upon employment of the shock absorbing apparatus 100; it would then be preferable that the gas be either generally unreactive, such as nitrogen ($N_2$) or provide an active fire retardant effect, e.g., through a halogen gas. It can also be preferable in certain applications that the inflation source 21, 22 provide a foam to the inflatable containers, 13, 14, 15, 16 which foam can also have a fire retardant effect in a manner well-known in the art.

Figure 2:
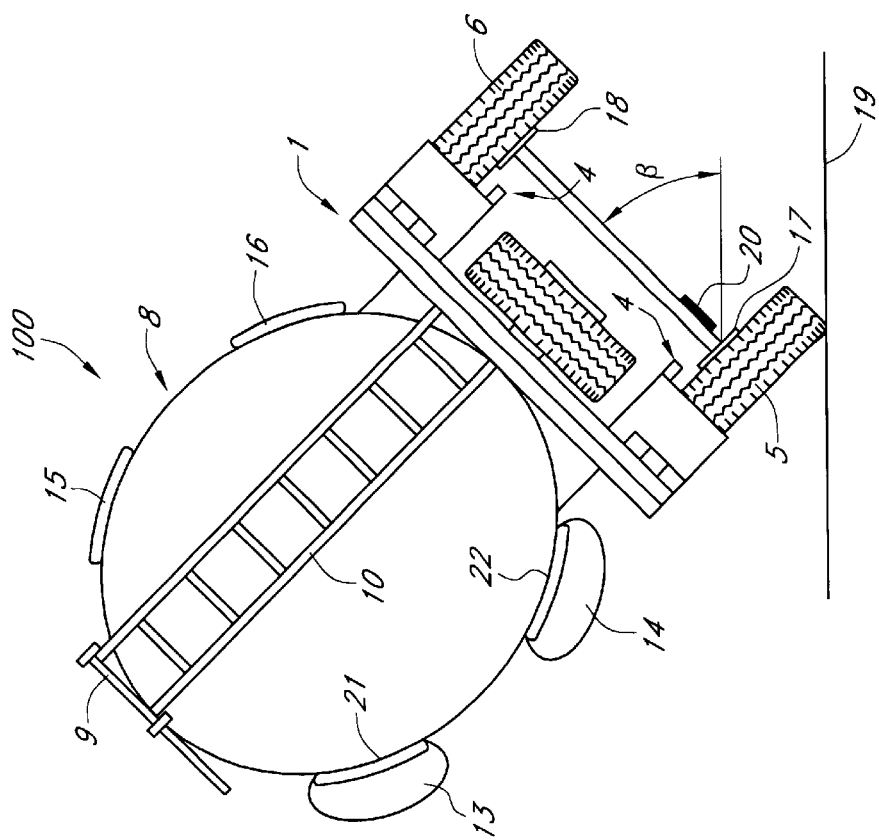
FIG. 2 is a rear view of the vehicle and safety arrangement of FIG. 1 with the vehicle being in an incipient overturn condition with the shock absorbing apparatus being activated.

In certain embodiments, as illustrated in FIG. 1, the inflation sources 21, 22 are contained within the inflatable containers 13, 14 respectively. in other embodiments (as shown in FIG. 2) the inflation sources 21, 22 are positioned adjacent, yet outside, the inflatable containers 13, 14, respectively. It is preferable that the inflation sources 21, 22 be positioned either adjacent or within the inflatable containers 13, 14 to facilitate rapid inflation thereof. This also avoids the complexity and material cost of providing additional plumbing to route gas and/or foam from the inflation sources 21, 22 to the inflatable containers 13, 14.

FIG. 2 shows an incipient overturning condition of the vehicle 1 indicated, in this embodiment, by observation of a loss of pressure between the wheel 6 and the road surface 19 as measured by the overturning sensor 18. In this embodiment, the overturning sensor 20 also detects the development of an angle $\beta$ between the vehicle 1 and the road surface 19. The signals from the overturning signals 18, 20 have been provided to the controller 23 which has induced the inflation sources 21 and 22 to inflate to inflatable containers 13 and 14, respectively, to provide protection to the vehicle 1 in case of an overturn. It will be understood that the controller 23 can be programmed or set with predetermined threshold values of the pressures registered by the sensors 17, 18 as well as a value of $\beta$ defining an incipient overturning condition indicating activation of the shock absorbing apparatus 100.

Figure 3:
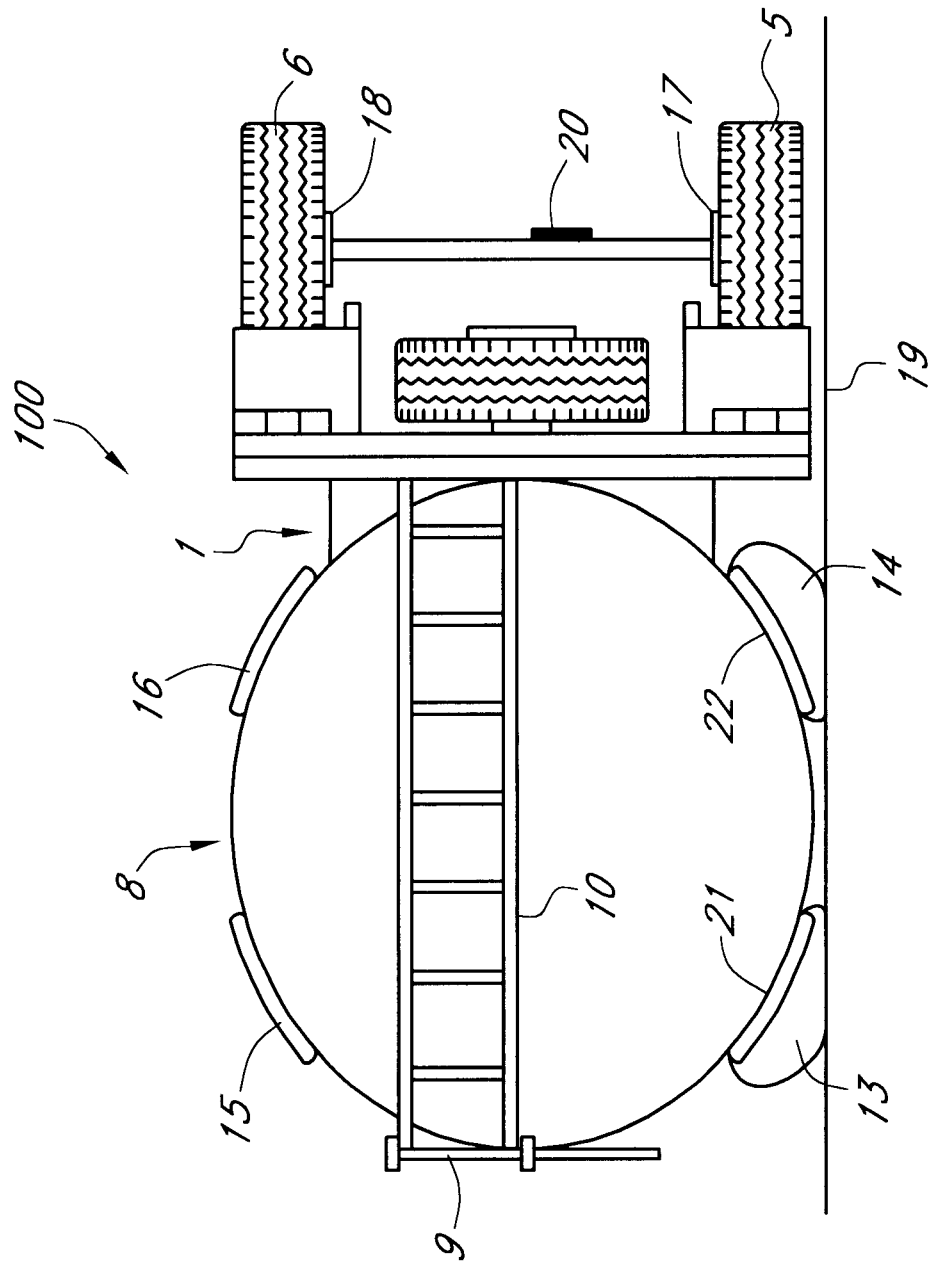
FIG. 3 is a rear view of the vehicle provided with the shock absorbing apparatus of FIGS. 1 and 2 in an overturned condition with the shock absorbing apparatus activated.

FIG. 3 illustrates an overturned condition where the vehicle 1 is resting on its side with the inflatable containers 13, 14 interposed between the vehicle 1 and the road surface 19. It can be seen that, in this embodiment, the weight of the vehicle 1 is borne by the inflatable containers 13, 14 rather than by, for example, the tank 8 Thus, the tank 8 is protected from violent contact with the road surface 19 and thus experiences a reduced risk of damage or rupture which may lead to the loss of contents stored within the tank 8.

While the shock absorbing apparatus 100 has been illustrated from a rear view with rear wheels 5 and 6 and rearwardly disposed sensors 17, 18, and 20, it will be understood that the vehicle 1 would have forwardly disposed wheels and can be further provided with forwardly disposed overturning sensors. Further, the shock absorbing apparatus 100 has been illustrated and described with respect to the vehicle overturning to the left, however it will be understood tat the inflatable containers 15, 16 would also be provided with corresponding inflation sources for a possible overturn to the right and that the controller 23 would be in communication with these inflation sources.

What is claimed is:

1. A shock absorbing apparatus wherein the shock absorbing apparatus is attached to the exterior of a vehicle positioned on a support surface and wherein the apparatus expands in volume upon detection of incipient overturning of the vehicle so provided such that the shock absorbing apparatus is interposed between the overturning vehicle and the support surface so as to cushion the vehicle.

2. The apparatus of claim 1, wherein the shock absorbing apparatus comprises:
   at least one flexible, inflatable container attached to a side of the vehicle;
   at least one overturning sensor; and
   a control system in communication with the at least one flexible, inflatable container and overturning sensor wherein the control system induces the flexible, inflatable container to inflate upon receiving an indication from the overturning sensor that the vehicle is overturning.

3. The apparatus of claim 2, wherein the overturning sensor comprises a pressure sensor attached to the vehicle wherein the pressure sensor produces an overturning signal upon determining that a wheel of the vehicle has lost contact with the support surface.

4. The apparatus of claim 2, wherein the overturning sensor comprises an angle sensor attached to the vehicle and wherein the angle sensor produces an overturning signal upon determining that at least a portion of the vehicle has exceeded a predetermined lean angle with respect to the support surface.

5. The apparatus of claim 2, wherein the flexible, inflatable container is provided a volume of gas to inflate the container.

6. The apparatus of claim 5, wherein the gas is a fire-retardant gas.

7. The apparatus of claim 6, wherein the fire-retardant gas comprises halon.

8. The apparatus of claim 5, wherein the volume of gas is provided by a high pressure gas cylinder arranged in the container.

9. The apparatus of claim 2, wherein the flexible, inflatable container is provided a volume of foam to inflate the container.

10. The apparatus of claim 9, wherein the foam is fire retardant.

11. The apparatus of claim 1, wherein the apparatus is generally elongate and positioned immediately adjacent the vehicle so as to extend along the longitudinal axis of the vehicle and wherein the apparatus is configured to conform to the outer contour of the vehicle so as to minimize air resistance of the vehicle as provided with the apparatus.

12. The apparatus of claim 1, wherein the apparatus is generally cylindrical.

13. The apparatus of claim 1, wherein the coefficient of friction of the apparatus is greater than the coefficient of friction of the vehicle adjacent the apparatus.

14. The apparatus of claim 1, wherein the apparatus in the expanded volume state increases the buoyancy of the vehicle with the apparatus attached thereto.

15. A vehicle comprising a shock absorbing system wherein at least a portion of the shock absorbing system is attached to the exterior of the vehicle wherein the system detects overturning of the vehicle and induces the portion of the shock absorbing system attached to the exterior of the vehicle to expand in volume so as to cushion the exterior of the vehicle against impact.

16. The vehicle of claim 15, wherein the shock absorbing system comprises:
    an inflatable container attached to the exterior of the vehicle;
    an inflation source in communication with the inflatable container;
    an overturning sensor providing a signal indicative of impending roll-over of the vehicle; and
    a controller in communication with the overturning sensor and the inflation source wherein the controller induces the inflation source to inflate the inflatable container upon receiving a roll over signal from the overturning sensor.

17. The vehicle of claim 16, wherein the inflatable container has a higher coefficient of friction than the vehicle adjacent the inflatable container.

18. The vehicle of claim 16, wherein the inflation source comprises a high-pressure gas cylinder arranged inside the inflatable container.

19. The vehicle of claim 16, wherein the inflation source provides a gas to inflate the inflatable container.

20. The vehicle of claim 19, wherein the gas is fire retardant.

21. The vehicle of claim 16, wherein the inflation source provides a foam to the inflatable container.

22. The vehicle of claim 21, wherein the foam is fire retardant.

23. The vehicle of claim 16, wherein the overturning sensor is a pressure sensor attached to the vehicle wherein the pressure sensor provides the roll over signal upon determining that at least a portion of the vehicle has lost contact with a solid surface.

24. The vehicle of claim 16, wherein the overturning sensor is a roll sensor attached to the vehicle and wherein the roll sensor provides the roll over signal upon determining that at least a portion of the vehicle has exceeded a certain roll angle.

25. The vehicle of claim 16, wherein an inflatable container is attached to each side of the vehicle and wherein the controller induces the inflation source to inflate only those inflatable containers on the downward side of the vehicle.

* * * * *

UNITED STATES PATENT AND TRADEMARK OFFICE
CERTIFICATE OF CORRECTION

PATENT NO. : 6,499,796 B1
DATED : December 31, 2002
INVENTOR(S) : Erik Jeroen Eenkhoorn It is certified that error appears in the above-identified patent and that said Letters Patent is hereby corrected as shown below:

<u>Title page,</u>
Item [76], the Inventor's name should read -- Erik Jeroen Eenkhoorn --; and the address should read -- Paul Pellastraat 52, NL-7558 HG Hengelo (NL) --

Signed and Sealed this

Thirteenth Day of April, 2004

JON W. DUDAS
*Acting Director of the United States Patent and Trademark Office*